Nov. 11, 1952          P. M. ARNOLD          2,617,714

PROCESS FOR PRODUCING CARBON BLACK

Filed Sept. 17, 1951

INVENTOR.
P. M. ARNOLD
BY Hudson & Young
ATTORNEYS

Patented Nov. 11, 1952

2,617,714

UNITED STATES PATENT OFFICE 2,617,714

PROCESS FOR PRODUCING CARBON BLACK

Philip M. Arnold, Bartlesville, Okla., assignor to Phillips Petroleum Company, a corporation of Delaware Application September 17, 1951, Serial No. 247,011

14 Claims. (Cl. 23—209.6)

This invention relates to the production of carbon black. In one specific aspect it relates to the production of carbon black in a furnace by pyrochemical action in which the degree of the atomization of the oil sprayed in the furnace is increased and the size of the resulting droplets is decreased by the addition of water to the hydrocarbons being reacted to form the carbon black. In another specific aspect it relates to the production of carbon black from heavy refined hydrocarbons having an API gravity of —5 to 20° API and an initial boiling point above 200° F. by adding from 1 to 40 per cent by weight of water to them as an emulsion before a pyrochemical treatment in a furnace to convert them to carbon black.

While the present process is applicable to any type of carbon black furnace in which carbon black is made by pyrochemical cracking operations with valuable results, it is particularly adapted to operate with carbon black furnaces having a circumferentially, axially and/or helically moving blanket of air, air and fuel, flame, and/or hot combustion gases such as disclosed in the patent to Ayers Re. 22,886 June 3, 1947, Krejci Patents 2,375,795; 2,375,796; 2,375,797 and 2,375,798 all of May 15, 1945 and 2,564,700 of August 21, 1951 and all such similar carbon black furnace processes.

It has been found that in the making of carbon black from such heavy hydrocarbons in such carbon black furnace processes that the total yield of carbon black, and the yield per unit of reactant hydrocarbon, may be increased when the rate of feed of said hydrocarbon is increased, but that the rate of feed of said hydrocarbon is limited because of difficulties in spraying, atomizing, and finally vaporizing the same. This heavy hydrocarbon, when fed as rapidly as possible, tends to deposit carbon and coke on the furnace wall.

The present invention provides a means for allowing high feed rates of such heavy hydrocarbons along with complete atomization and vaporization because the water in the hydrocarbon emulsion flashes into steam of about 1700 times its water volume and further atomizes and disperses the droplets of hydrocarbon almost instantly, which enables greater feed rates and the production of high quality carbon black from such heavy hydrocarbons, without coking up the furnace.

One object of the invention is to produce increased quantities of commercially acceptable carbon black per furnace hour and/or per unit of said heavy hydrocarbon feed.

Another object is to produce from said heavy hydrocarbons a carbon black having improved qualities, such as high abrasion resistance of rubber compounds containing the same.

Another object is to make carbon black.

Numerous other objects and advantages will be apparent to those skilled in the art upon reading the accompanying specification, claims and drawings.

Figure 1:
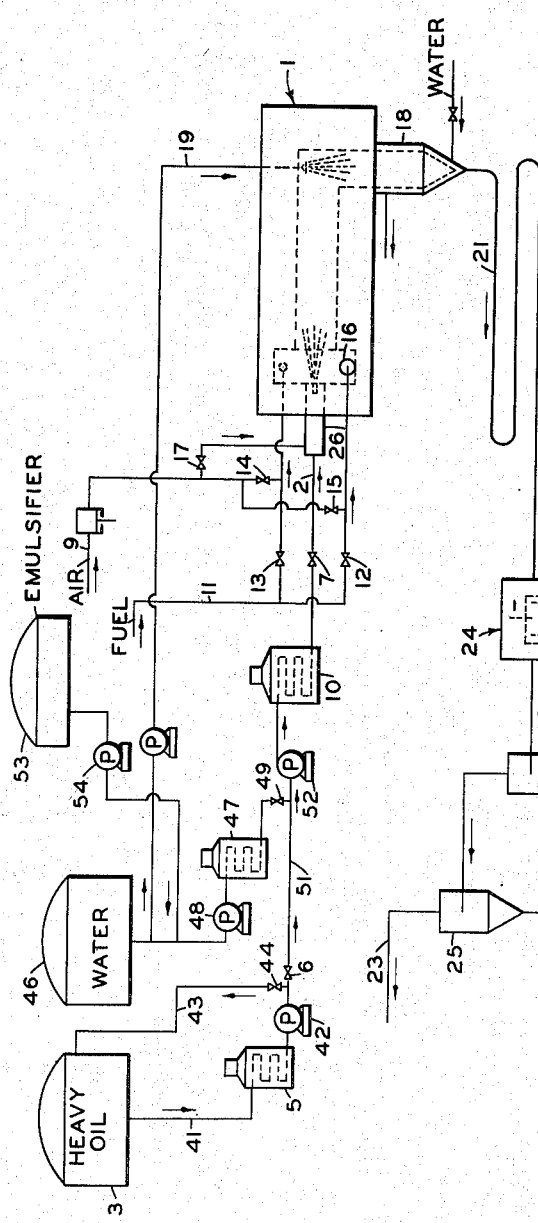
Figure 1 is a schematic diagram with the parts shown by conventional symbols of a carbon black producing plant embodying the present invention.

A carbon black furnace generally designated as 1 is provided which preferably is constructed and operated as set forth in any of the patents mentioned above, but which may be any carbon black furnace in which hydrocarbons are converted to carbon black by pyrochemical action.

Furnace 1 is provided with a reactant hydrocarbon feed 2 which is passed axially through the furnace and this hydrocarbon feed is a heavy refined hydrocarbon having an API gravity of from —5 to 20° API and an initial boiling point above 200° F. from tank 3, valves 6 and 7 being opened. Feed 2 may be preheated in heaters 5 and 10. At the same time hot combustion gases, flame, or free-oxygen containing gas, such as air in 9, either with or without fuel in the form of gas and/or oil coming through line 11, is blended by means of valves 12, 13, 14 and 15 and is injected tangentially into furnace 1 through pipe 16. A portion of the hydrocarbon 2 and/or the fuel 11 is burned in the free-oxygen containing gas 9 in furnace 1 to heat the remaining portion of the hydrocarbon 2 to such an extent that pyrochemical action converts a portion thereof to carbon black. If desired, some of air 9 may be admitted through valve 17 into a small annular space 37 surrounding feed pipe 2 in order to reduce or obviate the formation of carbon black or tar on the end of feed pipe 2 during long continued operation of furnace 1. As all these features of furnace operation are fully disclosed in patents mentioned above they are only mentioned briefly in this specification.

It is customary to cool the resulting carbon black containing gases from furnace 1 below the ignition or further reaction temperatures by any suitable means such as water jacket 18, water quench 19 and/or indirect heat exchange with the air at 21. It is then customary to separate the carbon black 22 from the off gas 23 by means of any suitable means, such as separating means generally designated as 24. Means 24 may be an electrical precipitator 20, cyclone separators 25, and/or bags or filters (not shown) or any combination of the same found suitable by the prior art.

Figure 2:
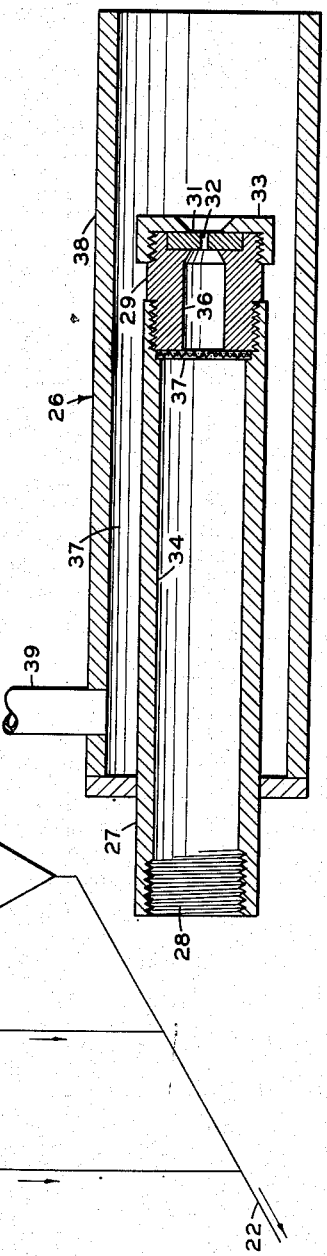
Figure 2 is a cross sectional view of one form of a suitable spray nozzle for use in the present invention.

In Figure 2 is shown in cross section one form of a spray nozzle, generally designated as 26, suitable for use in the present invention. The essential feature of spray 26 is an inlet tube 27 adapted to be connected at 28 to pipe 2 of Figure 1 and having some conventional form of spray device 29 mounted to spray the oil axially into the furnace in the form of a solid, or hollow, conical spray. The exact form of the spraying head 29 is not important because spray heads of two different companies having spray angles of 30° and 80° gave substantially equivalent and satisfactory results as shown in Table II below. Most of these spray devices comprise an orifice plate 31 having an orifice 32 therethrough. The orifice plate is retained by a suitable retainer such as cap 33. Forcing the oil under pressure from bore 34 of pipe 27 and bore 36 of pipe 29 through the orifice 32 results in the formation of a fine spray. As shown in Figure 2 a 30° spray will easily pass out of the end of 26 without contacting the same, but if an 80° spray were used then tube 26 would have to be shortened at its right end so that the spray would miss the tube. While not essential, it is highly desirable to have some sort of filter in the system to keep solid particles from striking orifice 32 and this filter may be placed almost anywhere in the hydrocarbon supply line, however the nearer it is to orifice 32 the more effective it will be, and such a screen or filter has been shown at 37 of Figure 2.

While not essential to the invention, it is preferable to form the spray assembly 26 with an annular space 37 between the hydrocarbon inlet pipe 27 and the outer body 38 which is retained in the furnace 1. This is because carbon or coke deposits will tend to form on cap 33 unless there is some air blown in through annular space 37 from line 9 through valve 17 and connecting pipe 39. It is desired to emphasize the fact, however, that commercial operations can be carried out without the annular space 37 being supplied with air, so such annulus air in space 37 is not regarded as being any true or essential part of the present invention, although useful therewith. The convenience of using this annulus air entering through space 37 is well known in the prior art as shown by space 23 in Figure 3 of Krejci 2,375,795 of May 15, 1945, and in corresponding parts of many other patents in the carbon black field.

The apparatus of Figures 1 and 2 which has been described up to this point, therefore, is substantially conventional with the exception that two heaters 5 and 10 have been shown whereas generally one heater has been sufficient in the prior art, and in fact one heater may at times be sufficient in the present invention. It is also old in the prior art to heat the oil 3 by passing the same through pipe 41, heater 5, pump 42 and recycling a portion thereof through pipe 43 controlled by valve 44. The present invention, therefore, comprises the improvement set forth in the following description of Figures 1 and 2:

In a continuous furnace carbon black producing process shown in Figure 1 comprising the continuous steps of spraying a heavy refined hydrocarbon 3 of −5 to 20° API gravity in the liquid state as droplets into a carbon black furnace 1, heating said hydrocarbon in said furnace, converting a portion of said hydrocarbon to carbon black by a pyrochemical cracking operation in a first zone of said furnace, cooling the effluent resulting carbon black containing gases 21 and separating said carbon black 22 from said gases, the improvement of the present invention comprises forming an emulsion of said heavy hydrocarbon with from 1 to 40 percent by weight of water from tank 46 before spraying said hydrocarbon through spray orifice 32 into said first zone whereby said water and said hydrocarbon droplets upon entering said furnace 1 flash into steam disrupting said droplets and further subdividing them. The emulsion components consisting of oil 3 and water 46 may be heated separately or together in heaters 5, 10 and 47 as will now be explained. Water from tank 46 may be pumped by pump 48 into hydrocarbon inlet 2 through valve 49. If a suitable emulsion is not formed by merely pumping the water through 49 into the hydrocarbon in pipe 51, then a suitable mechanical emulsifier may be supplied such as centrifugal mixing pump 52. If difficulty is still encountered in forming the emulsion, a suitable emulsifier from tank 53, such as liquid soap, aqueous soap solution, or any other oil and water emulsifier known to the prior art, may be added through pump 54. The water 46 may be heated in either or both of heaters 47 and 10, provided it is not heated above its boiling point at the pressure under which said heating occurs. However, the water need not be heated at all in heaters 47 and 10 provided sufficient heating of the oil occurs in heater 5. Similarly oil from tank 3 may be heated in heater 5 and pumped by pump 42 through pipe 51 and then heated again in heater 10, or either or both heaters 5 and 10 can be eliminated and the heating be heating of water only in heater 47. However, as the oil is generally capable of being heated to a considerably higher temperature at any given pressure before vaporizing, in most instances, it will be desirable in such instances to heat the oil, or heat both oil and water, especially if the percentage of water used is low. The emulsion components, oil 3 and water 46, are heated under high pressure to a temperature above the boiling point of water at atmospheric pressure but below the boiling point of water and the initial boiling point of the oil at the high pressure under which said heating occurs, and said high pressure is relieved upon spraying said heated emulsion into the furnace 1 through orifice 32 to a pressure at which said water in said emulsion at said temperature will vaporize. The pressure in the interior of furnaces such as 1 is not very far from atmospheric pressure, generally being at a pressure of a few pounds per square inch above atmospheric pressure. Obviously when the pressure in furnace 1 is higher or lower than atmospheric pressure by a considerable degree this factor should be taken into consideration in determining the temperature at which to heat the emulsion, so that when the high pressure is relieved upon spraying said heated emulsion into the furnace to a pressure at which said water in said emulsion at said temperature will vaporize, the desired explosive effect of the water flashing into steam will be achieved and the oil droplets will be further dispersed and atomized by such explosions. In flashing into steam the liquid water is converted into approximately 1700 times its volume as water, which has a considerable disruptive effect on the oil droplets. Whether to use an emulsifying agent 53 or not depends on the characteristics of the particular heavy oil employed, some emulsifying with water much more easily than others, and some needing no emulsifying agent at all under the conditions of pressure and mixing shown in Figure 1. When an emulsifying agent is used, the type employed depends on the composition of oil 3 and possibly on contaminating materials in water

46 such as the usual salts in hard waters found throughout the country. Therefore applicant has not attempted to name all known emulsifying agents, nor to give any examples of amounts of emulsifying agent to be employed, as such are all within the skill of those skilled in the art of making emulsions and the details can be supplied by an engineer upon analysis of the oil 3 and the water 46. It is preferred to use soft, pure water for 46, but hard water may be employed with considerable success in the practice of the present invention.

EXAMPLES

The following examples are representative of the present invention:

A No. 6 fuel oil, designated F-6, proved too heavy for vaporization and injection into the furnace as vapor from a practical standpoint, although carbon black could be made in that manner of a suitable quality but in a smaller quantity than desired. This particular fuel oil was a vacuum still overhead. It was also possible to spray this heavy oil into the furnace without forming an emulsion with water and thereby produce carbon black of a suitable quality with considerable mechanical difficulties. As an aid to atomization of this grade oil, five per cent water was added to the heavy oil and the mixture emulsified. This emulsion was sprayed into the furnace in Runs No. P-288; P-289; and P-290, while for purposes of comparison Run No. P-280 was made with a vaporized gas-oil and no water.

The heat necessary to flash the droplets into smaller droplets by the water therein flashing into steam was provided by pre-heating the oil from tank 3 to 400° Fahrenheit. In the control run P-280 the gas-oil which was 58.3° F. aniline number and 23.6° API gravity was completely vaporized which vaporization occurs at about 700° F.

The properties of the F-6 fuel oil feedstock are listed in Table I and the operating data of the furnace during all of the run is summarized in Table II. The carbon black produced in these runs P-288; P-289; P-290 and the control line P-280 was collected and tested in rubber compounds and the rubber data obtained therefrom is summarized in Table III.

TABLE I
*Properties of feedstock No. F-6*

| Gravity, °API | Viscosity, SFV at 122 | Carbon Residue (Conradson), Percent | BS & W, Percent | Salt or Solid Material, Percent | Aniline No., °F. | Vacuum Distillation | | | | | | | | | | Pour Pt., °F. | B. of Mines Correlation Index |
|---|---|---|---|---|---|---|---|---|---|---|---|---|---|---|---|---|---|
| | | | | | | IBP | 5% | 10% | 20% | 30% | 40% | 50% | 60% | 70% | 80% | | |
| 10.3 | 30.5 | 6.0 | 0.2 | 0 | 145.0 | 448 | 570 | 634 | 709 | 765 | 806 | 860 | 902 | 940 | 1004 | 90 | 82.2 |

TABLE II
*Summary of operating data*

NO. 1 VAC. STILL OVERHEAD (F-6) CONTAINING 5% WATER

| Run No. | Oil Rate, G.P.H. | Angle of Oil Spray, degrees | Oil Preheat Temp. (°F.) | Spray Pressure, Lb./sq. in. | Tang. Air Rate, C.F./H. | Jacket Air Rate, C.F./H. | Photometer | Reactor Temp., °F. | Off Gas, Percent by Volume, Dry Basis | | | | | | Pilot Plant Yield, Lbs./gal. | 80 Mesh Grit, Percent | 325 Mesh Grit, Percent | Tint, Percent |
|---|---|---|---|---|---|---|---|---|---|---|---|---|---|---|---|---|---|---|
| | | | | | | | | | CO₂ | CO | H₂ | C₂H₂ | CH₄ | N₂ | | | | |
| P-288 | 152 | 30 | 400 | 1,025–1,725 | 125,000 | 4,000 | 89 | 2,458 | 6.34 | 10.34 | 11.82 | 0.80 | 0.72 | 69.98 | 3.39 | 0.014 | 0.226 | 172 |
| P-289 | 156 | 80 | 400 | 1,900 | 125,000 | 4,000 | 92 | 2,492 | 6.09 | 10.56 | 11.52 | 0.86 | 0.82 | 70.15 | 3.46 | 0.001 | 0.317 | 159 |
| P-290 | 131 | 80 | 400 | 1,110 | 125,000 | 4,000 | 99 | 2,575 | 6.03 | 11.53 | 10.14 | 0.27 | 0.46 | 71.57 | 3.07 | 0.001 | 0.673 | ------ |

CONTROL RUN MADE WITH VAPORIZED GAS OIL AND NO WATER

| Run No. | Oil Rate | Angle | Oil Preheat Temp. | Spray Pressure | Tang. Air | Jacket Air | Photometer | Reactor Temp. | CO₂ | CO | H₂ | C₂H₂ | CH₄ | N₂ | Pilot Plant Yield | 80 Mesh | 325 Mesh | Tint |
|---|---|---|---|---|---|---|---|---|---|---|---|---|---|---|---|---|---|---|
| P-280 [1] | 170 | none | 700 to 750 | (²) | 125,000 | 4,000 | 89 | 2,498 | 5.50 | 11.36 | 12.87 | 0.97 | 0.79 | 68.51 | 3.08 | ------ | 0.719 | ------ |

[1] Control run made with vaporized gas oil, °F. 58.3 Aniline No. and 23.6° API.
² Was completely vaporized, hence no spray pressure.
The reactor was free from carbon deposits after all runs except P-280 where there was a very thin spiral of carbon at the inlet of the reduced diameter section of the furnace.

TABLE III
*Rubber data—30 minute summary*

NO. 1 VACUUM STILL OVERHEAD CONTAINING 5% WATER

| Black from Run No. | 300% Modulus | 80° F. | | 200° F. | | 10% Dynamic, p.s.i. | | | Percent Permanent Set | Percent Resilience | Flex Life, M. | Shore Hardness | ASTM Hardness | Abrasion loss (Gms.) | Compounded MS 1½ 212° F. | Scorch at 250° F. | | Extrusion at 250° F. | |
|---|---|---|---|---|---|---|---|---|---|---|---|---|---|---|---|---|---|---|---|
| | | Tensile Break, p.s.i. | Percent elongation | Tensile Break, p.s.i. | Percent Elongation | ATF | Initial | Final | | | | | | | | Minimum Mooney | Minutes to Scorch | In./Min. | Gms./Min. |
| P-288 | 1,320 | 3,030 | 520 | 1,440 | 300 | 65.2 | 113.4 | 107.1 | 3.4 | 61.3 | 7.9 | 55.5 | 56 | 3.73 | 34 | 43.5 | 9+ | 37 | 99.2 |
| P-289 | 1,340 | 2,910 | 495 | 1,130 | 245 | 66.9 | 101.3 | 101.8 | 3.2 | 62.4 | 18.0 | 55.5 | 58.5 | 3.98 | 32 | 41.5 | 9 | 37.8 | 99.8 |
| P-290 | 1,330 | 2,790 | 485 | 1,110 | 255 | 65.9 | 100.0 | 95.6 | 3.7 | 62.4 | 10.6 | 55 | 60.5 | 3.65 | 33.5 | 43.5 | 9 | 39 | 102.8 |

CONTROL RUN MADE WITH VAPORIZED GAS OIL AND NO WATER

| Black from Run No. | 300% Modulus | Tensile Break 80°F | Percent elong. | Tensile Break 200°F | Percent Elong. | ATF | Initial | Final | Percent Perm. Set | Percent Resilience | Flex Life | Shore | ASTM | Abrasion | Compounded | Min. Mooney | Min. to Scorch | In./Min. | Gms./Min. |
|---|---|---|---|---|---|---|---|---|---|---|---|---|---|---|---|---|---|---|---|
| P-280 | 1,310 | 2,910 | 510 | 830 | 200 | 67.6 | 102.9 | 103.2 | 3.2 | 62.1 | 8.5 | 55 | 59.5 | 3.72 | 33 | 42.5 | 8.5 | 38 | 101 |

*Oven aged 24 hrs./212° F.*

NO. 1 VACUUM STILL OVERHEAD CONTAINING 5% WATER

| | | | | | | | | | | | | | | | | |
|---|---|---|---|---|---|---|---|---|---|---|---|---|---|---|---|---|
| P-288 | 2,140 | 2,820 | 365 | ----- | ----- | 60.8 | 176.7 | 156.1 | 0.6 | 67.4 | 4.7 | 63 | ----- | 3.99 | ----- | ----- |
| P-289 | 2,120 | 2,670 | 360 | ----- | ----- | 58.1 | 158.9 | 145.0 | 0.6 | 69.0 | 3.7 | 61 | ----- | 4.29 | ----- | ----- |
| P-290 | 2,180 | 2,700 | 345 | ----- | ----- | 57.5 | 146.0 | 130.1 | 0.7 | 68.6 | 5.5 | 60 | ----- | 4.08 | ----- | ----- |

SAME CONTROL RUN

| | | | | | | | | | | | | | | | | |
|---|---|---|---|---|---|---|---|---|---|---|---|---|---|---|---|---|
| P-280 | 2,320 | 2,750 | 345 | ----- | ----- | 57.5 | 166.2 | 152.8 | 0.6 | 67.6 | 4.8 | 61 | ----- | 4.19 | ----- | ----- |

ᵃ 35 minute cures.
ᶜ 45 minute cures.

It is believed the above data illustrates that it is possible by using the present invention to produce carbon black having comparable and satisfactory characteristics in the rubber reinforcement value to the carbon blacks produced from the formerly highly preferred gas-oil by emulsifying heavy refined hydrocarbons having an API gravity of −5 to 20° API and an initial boiling point above 200° F. with 1 to 40 per cent by weight of water and spraying the same into a furnace and converting them into carbon black by pyrochemical treatment. While the emulsion may be heated to any temperature above the boiling point of water at the pressure in said furnace but below the boiling point of water and the initial boiling point of the oil at the pressure under which said heating occurs, it is preferred to employ oils having an initial boiling point above 450° F. and heat the same to about 400° F. The oil may range from −5 to 20° API gravity although the oil in the test ran about 10° API gravity. While the spray pressure may be from 500 to 6000 pounds per square inch it is preferred to use a spray pressure of about 1000 pounds per square inch which is enough pressure to insure thorough spraying with small droplets and at the same time obviate undue erosion of the spray orifice 32 due to higher pressures. While the water content of the emulsion may be from 1 to 40 per cent the best results are obtained when the water content is from 2 to 10 per cent, and with the No. 6 fuel oil it is preferred to use about 5 per cent by weight of water in the emulsion. The term "refined oil" is used to distinguish from crude oil which may contain anything. The refined oil of the present invention has an initial boiling point above 200° F. which indicates that the refining has at least comprised topping the crude oil to remove lighter constituents. Other refining steps may be included, in fact thermal or catalytic cracking, and other reforming, recycling and separation by ordinary or vacuum distillation, or any process which tends to increase the aromatic, cyclic or olefinic content, tends to improve this oil for carbon black making purposes especially as to yield of carbon black per gallon of oil, any improvement in quality of the carbon black thereby sometimes not occurring or not being proved.

While a system and its various component parts have been shown in considerable detail, this has been done for the purpose of illustrating a preferred embodiment of the invention, which invention is not limited thereto.

Having described my invention, I claim:

1. In a continuous furnace carbon black producing process comprising the continuous steps of spraying a heavy refined hydrocarbon of −5 to 20° API gravity and with an initial boiling point above 200° F. in the liquid state as droplets into a carbon black furnace, heating said hydrocarbon in said furnace, converting a portion of said hydrocarbon to carbon black by a pyrochemical cracking operation in a first zone in said furnace, cooling the effluent resulting carbon black containing gases, and separating said carbon black from said gases, the improvement comprising forming an emulsion of said heavy hydrocarbon with from 1 to 40% by weight of water before spraying said hydrocarbon into said first zone whereby said water in said hydrocarbon droplets upon entering said furnace flashes into steam disrupting said droplets and further subdividing them.

2. The process of claim 1 in which the emulsion components are heated under high pressure to a temperature above the boiling point of water at the pressure in said furnace but below the boiling point of water and the initial boiling point of the oil at the pressure under which said heating occurs, and said high pressure is relieved upon spraying said heated emulsion into the furnace to a pressure at which said water in said emulsion at said temperature will vaporize.

3. The process of claim 2 in which an emulsifying agent is added to the water and oil to form the emulsion.

4. The process of claim 2 in which the oil and water are heated separately.

5. The process of claim 4 in which an emulsifying agent is added to the water and oil to form the emulsion.

6. The process of claim 2 in which the emulsion is heated after formation.

7. The process of claim 6 in which an emulsifying agent is added to the water and oil to form the emulsion.

8. The process of claim 2 in which the oil is stored in a supply tank, oil from said supply tank is heated separately to a temperature below its initial boiling point at atmospheric pressure, and a portion of said heated oil is recycled to said supply tank to heat the same and reduce the oil viscosity.

9. The process of claim 8 in which an emulsifying agent is added to the water and oil to form the emulsion.

10. The process of claim 2 in which the water content of said emulsion is about 5% by weight, the initial boiling point of said oil is about 450° F., the oil is about 10° API gravity and the spray pressure is above about 1000 pounds per square inch.

11. The process of claim 2 in which the water content of said emulsion is from 2 to 10% by weight, and the spray pressure is from 500 to 6000 pounds per square inch.

12. The process of claim 1 in which the emulsion is formed by mechanical mixing of the water and oil.

13. The process of claim 12 in which an emulsifying agent is added to the water and oil to form the emulsion.

14. The process of claim 1 in which the emulsifying agent is added to the water and oil to form the emulsion.

PHILIP M. ARNOLD.

No references cited.